US006438258B1

United States Patent
Brock-Fisher et al.

(10) Patent No.: US 6,438,258 B1
(45) Date of Patent: Aug. 20, 2002

(54) ULTRASOUND IMAGE PROCESSING EMPLOYING NON-LINEAR TISSUE RESPONSE BACKSCATTER SIGNALS

(75) Inventors: George A. Brock-Fisher, Andover, MA (US); Thomas J. Hunt, Pelham, NH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/012,892

(22) Filed: Jan. 23, 1998

(51) Int. Cl.[7] .................................................. G06K 9/00
(52) U.S. Cl. ....................... 382/128; 600/437; 600/443; 600/447
(58) Field of Search ................................ 382/128, 130, 382/131, 132; 600/437, 442, 443, 447

(56) References Cited

U.S. PATENT DOCUMENTS

| | | | |
|---|---|---|---|
| 4,561,019 A | | 12/1985 | Lizzi et al. .................. 358/112 |
| 5,706,819 A | | 1/1998 | Hwang et al. ......... 128/662.02 |
| 5,879,303 A | * | 3/1999 | Averkiou et al. ............ 600/447 |
| 5,897,500 A | * | 4/1999 | Zhao ........................... 600/443 |
| 5,928,151 A | * | 7/1999 | Hossack et al. ............ 600/443 |
| 6,106,465 A | * | 8/2000 | Napolitano et al. ......... 600/443 |
| 6,132,374 A | * | 10/2000 | Hossack et al. ............. 600/443 |
| 6,132,377 A | * | 10/2000 | Bolorforosh et al. ........ 600/458 |

OTHER PUBLICATIONS

"A New Imaging Technique Based on the Non-Linear Properties of Tissues", Averkiou et al., (Proceedings of the 1997 IEEE Ultrasonics Symposium).

* cited by examiner

Primary Examiner—Thomas D. Lee
(74) Attorney, Agent, or Firm—John Vodopia

(57) ABSTRACT

A method for processing ultrasound signal samples obtains enhanced images of a body structure through use of both harmonic and fundamental image processing. The method includes the steps of first obtaining a first plurality of signal samples from sensed backscatter signals that fall within a range of frequencies about a fundamental frequency of the transmitted ultrasound signal. Next, a second plurality of signal samples are obtained from backscatter signals that fall within a range of frequencies about a harmonic of a transmitted ultrasound signal. Control values are then derived from at least one of the first plurality of signal samples or the second plurality of signal samples. Those control values are then utilized to control the processing of the other of the signal samples to derive an improved ultrasound image. In a preferred embodiment, the control values are derived from the signal samples which result from sensed harmonic backscatter signals. Further, the control values are utilized to alter the processing of the fundamental signal samples (e.g., by variation of applied gain, filter frequency, filter bandwidth, etc.).

12 Claims, 3 Drawing Sheets

ULTRASOUND IMAGE PROCESSING EMPLOYING NON-LINEAR TISSUE RESPONSE BACKSCATTER SIGNALS

FIELD OF THE INVENTION

This invention relates to improved ultrasound imaging and, more particularly, to an ultrasound imaging method which employs both harmonic frequency backscatter signals which result from non-linear tissue response and fundamental frequency backscatter signals to provide improved image presentations.

BACKGROUND OF THE INVENTION

Researchers using contrast enhancing agents with diagnostic real-time medical ultrasound instruments have observed non-linear responses from both the contrast agents and from body tissues. A mode of system operation which has demonstrated this effect is the "second harmonic contrast agent mode". In such mode, a low frequency ultrasound signal is transmitted and the received backscatter signals are processed and filtered in such a manner as to be most responsive to the second harmonic of the fundamental frequency of the transmitted signal. When certain contrast agents are in use, their strong non-linear response characteristics, usually associated with the destruction of microbubbles, results in a significant second harmonic energy signal being generated and imaged by the ultrasound system.

Even when contrast agents are not in use, ultrasound systems have been used in the second harmonic imaging mode. See, for instance, "A New Imaging Technique Based on the Non-Linear Properties of Tissues", Averkiou et al., (Proceedings of the 1997 IEEE Ultrasonics Symposium). Averkiou et al. report that the use of harmonic energy for image formation provides enhanced image features, e.g., delineation of the endocardial borders in the instance of echocardiographic imaging. However, not all aspects of the image are enhanced. Specifically, the tissue texture, contrast resolution, spatial resolution and low speckle content aspects of an acceptable ultrasound image are seen to degrade when imaging in the harmonic mode. Such image degradation is principally due to the fact that in order to operate in the harmonic mode, the transmit signal is lowered in its fundamental frequency and is often reduced in bandwidth. These changes concentrate a sufficient amount of ultrasound energy at the fundamental frequency to produce a detectable response at the second harmonic frequency, but cause degradation of certain aspects of the resulting image.

To overcome some of the problems which result during second harmonic imaging, Averkiou et al. suggest use of various image processing techniques. For instance, it is suggested that the speckle artifact can be reduced by various frequency compounding (or diversity) approaches, (e.g. such as shown in U.S. Pat. No. 4,561,019 to Lizzi et al.). The Lizzi et al. method employs an averaging of signals from two or more frequency bands to reduce the speckle artifact.

Thus, while it is known that harmonic backscatter signals which result from non-linear properties of tissues produce certain enhancements in ultrasound images, the resulting images are generally inferior to those images that are constructed from backscatter returns at the fundamental frequency of a transmitted ultrasound signal. Nevertheless, certain of the image features that result when harmonic imaging techniques are employed are useful to the clinician. Accordingly, improved ultrasound images will result if features of both fundamental and harmonic ultrasound imaging can be combined.

SUMMARY OF THE INVENTION

A method for processing ultrasound signal samples obtains enhanced images of a body structure through use of both harmonic and fundamental image processing. The method includes the steps of first obtaining a first plurality of signal samples from sensed backscatter signals that fall within a range of frequencies about a fundamental frequency of the transmitted ultrasound signal. Next, a second plurality of signal samples are obtained from backscatter signals that fall within a range of frequencies about a harmonic of a transmitted ultrasound signal. Control values are then derived from at least one of the first plurality of signal samples or the second plurality of signal samples. Those control values are then utilized to control the processing of the other of the signal samples to derive an improved ultrasound image. In a preferred embodiment, the control values are derived from the signal samples which result from sensed harmonic backscatter signals. Further, the control values are utilized to alter the processing of the fundamental signal samples (e.g., by variation of applied gain, filter frequency, filter bandwidth, etc.).

DETAILED DESCRIPTION OF A PREFERRED EMBODIMENT

The preferred embodiment of the invention employs backscatter signals which result from non-linear tissue response to alter the processing of backscatter signals derived from signals at the fundamental frequency of transmitted ultrasound imaging signals. For instance, two or more identical transmit events are fired into a body being examined at the same angle and direction so as to interrogate the same region of interest. One of the transmit events occurs at a transmit frequency and power level which serves to enhance backscattered signals at a harmonic of the transmit frequency. The other transmit event occurs at a power level and frequency which is designed to provide an optimal ultrasound image (i.e., in relation to the aesthetic and/or diagnostic aspects of the image). The ultrasound system then combines the information gathered from the backscattered harmonic signals and the backscattered fundamental signals in such a manner as to enhance the resultant ultrasound image.

For instance, backscattered harmonic frequency samples are utilized to selectively control the gain that is applied to positionally co-located backscatter samples derived from backscatter returns at the fundamental frequency of the interrogating ultrasound signal. In such manner, the areas of enhanced brightness that result from the use of harmonic imaging samples are utilized to alter the fundamental frequency sample values so as to achieve an enhanced, combined ultrasound image. The backscattered harmonic signal samples can also be utilized to alter a filter frequency which is applied to the backscattered fundamental samples so as to enhance certain frequency aspects thereof. Other control modalities will become apparent from the description below.

Figure 1:
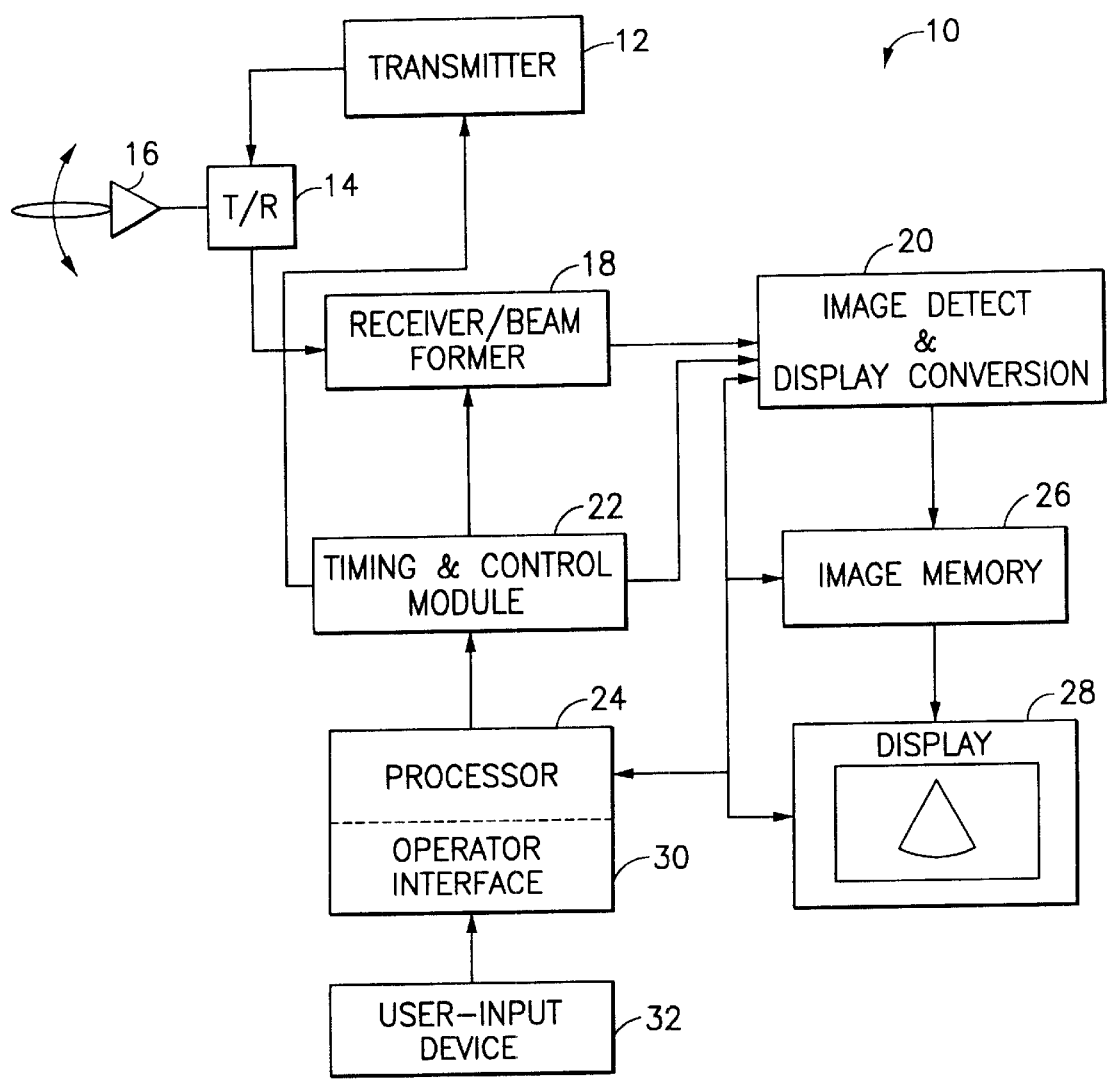
FIG. 1 is a block diagram of an ultrasound imaging system adapted to perform the method of the invention.

Turning to FIG. 1, ultrasound system 10 includes a transmitter 12 that produces ultrasound signals which are fed via a transmit/receive switch 14 to an ultrasonic transducer 16. Transmitter 12 is enabled to fire transducer 16 using multiple ultrasound frequencies. A first ultrasound frequency is one which provides a highest quality diagnostic ultrasound image, and a second ultrasound frequency is one which is designed to produce a large harmonic backscatter response (preferably the second harmonic). Note that while transmitter 12 will be hereafter described as having an ability to produce plural ultrasound transmitted frequencies, the invention also contemplates that transmitter 12 output ultrasound signals with a common fundamental frequency, from which are sensed both backscatter signals at the fundamental frequency and backscatter signals at a harmonic frequency.

In the preferred embodiment, multifrequency transmitter 12 sequentially energizes transducer 16 to scan a body area by generating (i) interrogating ultrasound pulses at a frequency which provides optimum imaging from backscatter at the fundamental signal frequency (hereafter referred to as fundamental backscatter signals) and (ii) interrogating ultrasound pulses at a frequency which provides a large backscatter signal return at a harmonic of the transmission frequency (hereafter referred to as harmonic backscatter signals). Both the fundamental and harmonic backscatter signals are sensed by transducer 16 and are routed by transmit/receive switch 14 to a receiver/beam former module 18. Receiver/beam former module 18 derives digital signal samples from the backscatter signals and buffers the digital samples.

Receiver/beam former module 18 thus enables storage of a first array of digital sample values which represent magnitudes of the fundamental backscatter signals and a second array of digital sample values which represent magnitudes of the harmonic backscatter signals. As will be understood, the respective digital sample values of the first and second arrays represent backscatter signals from body regions that are positionally coincident. This fact is used to enable a characteristic of one array of sample values to be utilized to alter the processing of positionally corresponding sample values from the other array.

The processing of the two arrays of sample values takes place in image detect and display conversion module 20, under control of timing and control module 22. A processor 24 provides overall control of ultrasound imaging system 10 and, more particularly, controls the operation of timing and control module 22, image detect and display conversion module 20, image memory and formatter module 26 and display 28. Processor 24 further includes an operator interface 30 which receives inputs from user input controls 32.

Figure 2:
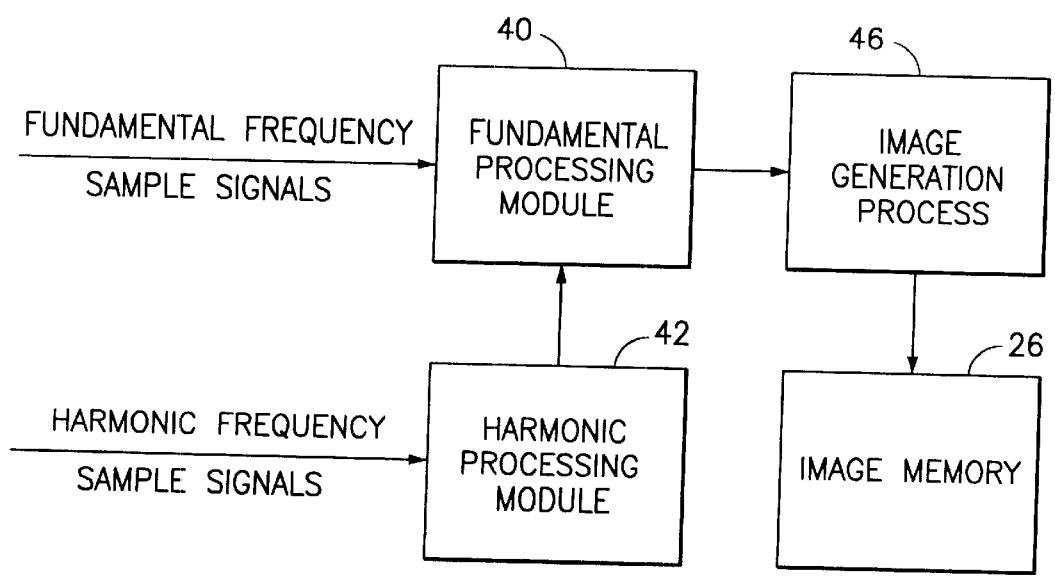
FIG. 2 is a schematic which illustrates the processing functions that are applied to received fundamental and harmonic backscatter samples.

The fundamental and harmonic backscatter sample values are fed from receiver/beam former 18 module to image detect and display conversion module 20. There they are respectively subjected to processing operations 40 and 42, as schematically shown in FIG. 2. The harmonic backscatter signal samples are fed to harmonic processing module 42 which detects a characteristic of each harmonic backscatter sample value (or group of values) and employs that characteristic to adjust the processing of fundamental backscatter sample values that is carried out by fundamental processing module 40.

In the preferred embodiment, harmonic processing module 42 senses an absolute magnitude of each received harmonic backscatter sample value and outputs a gain adjustment signal in accord therewith to fundamental processing module 40. The gain adjustment signal varies a gain function that is applied to a fundamental backscatter signal sample that positionally corresponds to the harmonic backscatter sample value (i.e., both signal samples are derived from echoes from a substantially identical body point). Thus, if the harmonic backscatter sample value exhibits a high level of brightness (indicating an edge feature), the gain applied to the corresponding fundamental backscatter sample value is increased so as enhance the brightness of that sample value. An image which results from fundamental backscatter sample values, after processing in fundamental processing module 42, will therefore exhibit increased brightness at points in the image dictated by the brightness of the harmonic backscatter sample values.

Accordingly, the gain to which each fundamental backscatter sample value is subjected is adaptively adjusted in accord with the absolute magnitude of each positionally corresponding harmonic backscatter signal sample. The gain control procedure need not necessarily be on a sample-by-sample basis, but rather may represent an average of a set of sample values or another normalized value.

In addition to altering a gain characteristic of fundamental processing module 40, the output from harmonic processing module 42 can be utilized to alter a filter function which is applied to the fundamental backscatter sample values. More particularly, harmonic backscatter sample values are, in certain cases, indicative of tissue boundaries (i.e., edges). Thus, within fundamental processing module 40, the resolution of fundamental backscatter sample value processing at an edge feature can be improved by increasing a center frequency of a filter function and altering the filter function's bandwidth. Such an adjustment enables capture of higher frequency components of the fundamental backscatter sample values which may then be utilized to improve image resolution at the detected edge feature.

Should a particular filter type that implements the filter action be non-optimum to achieve a desired frequency/bandwidth selectivity, the output from harmonic processing module 42 can be used to cause an entirely different filter type to be accessed for application to the fundamental backscatter sample values. For instance, a filter which is adapted for low pass, broad bandwidth operation could be changed to a filter which is better adapted to high pass, narrow bandwidth operations.

Subsequent to the above described processing of the backscatter sample values, the altered fundamental backscatter sample values are fed to image generation process 46 where the polar coordinate sample values are converted to a raster image, which is subsequently stored in image memory 26. Thereafter, the resulting raster image is presented on display 28 for user evaluation.

Figure 3:
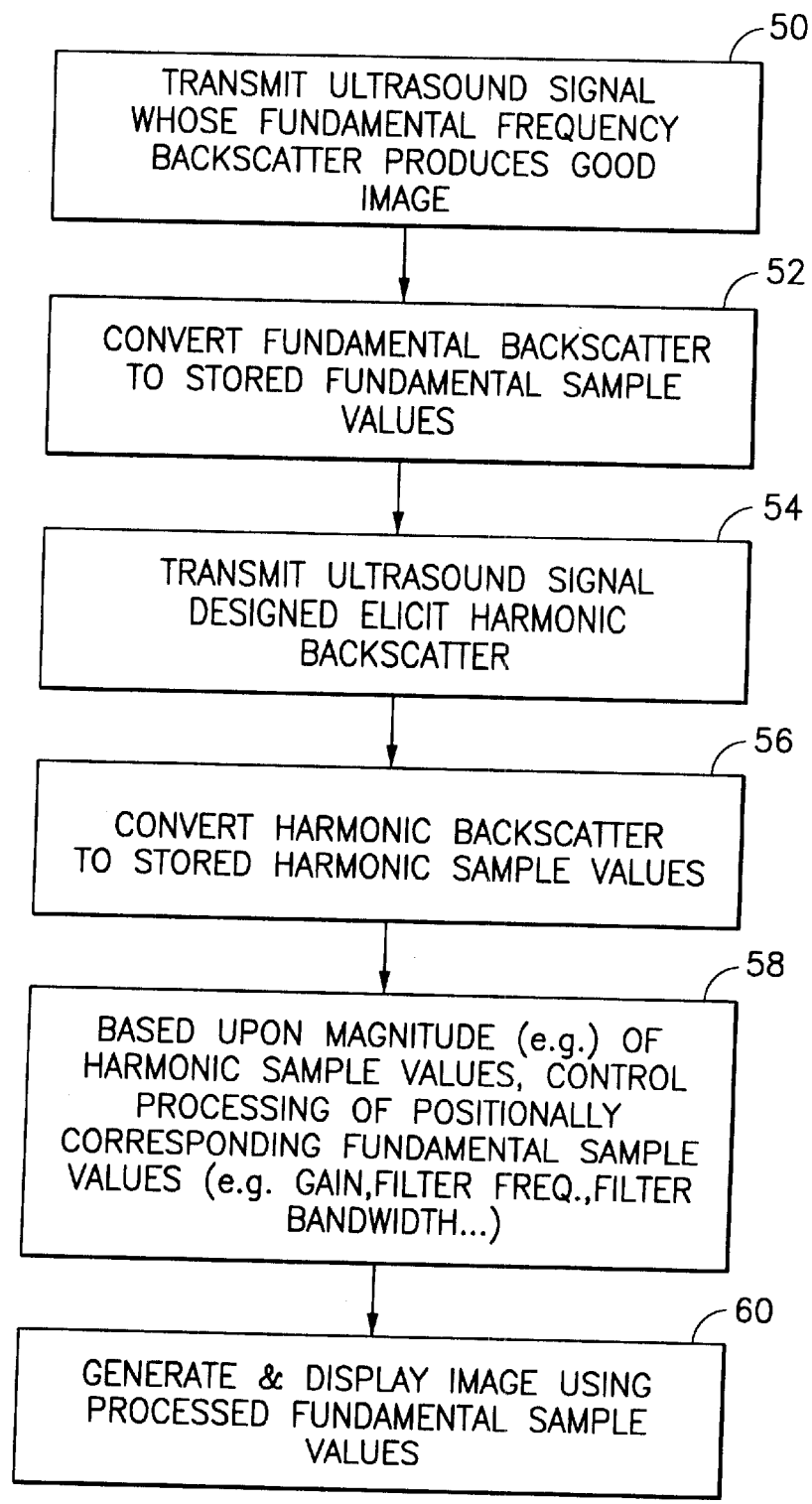
FIG. 3 is a high level logic flow diagram illustrating the method of the invention.

The method of the invention will now be described in conjunction with the illustrated logical flow diagram of FIG. 3. Initially, transducer 16 is caused to transmit an ultrasound signal whose fundamental backscatter signals produce a best ultrasound image (box 50). The received fundamental backscatter signals are converted into fundamental backscatter sample values and are buffered (box 52). Thereafter, an ultrasound signal that is designed to elicit high amplitude, harmonic backscatter signals is transmitted (box 54). The received harmonic backscatter signals are converted to harmonic backscatter sample values and are stored (box 56).

Then, based upon the magnitude of each harmonic backscatter sample value, positionally corresponding fundamental backscatter sample values are processed in such a manner as to enhance the ultimate ultrasound image (box 58). More specifically, the harmonic backscatter sample values are analyzed and utilized to alter the gain, filter frequency, bandwidth, filter type, etc. of the signal processing that is applied to positionally corresponding fundamental backscatter sample values. Thereafter, a raster image is generated and displayed of the processed fundamental backscatter samples which have been enhanced as a result of the processing alterations achieved through analysis of the harmonic backscatter samples (box 60).

The above description has assumed that the processing to which the fundamental backscatter sample values is subjected is altered in accordance with a characteristic of positionally corresponding harmonic backscatter sample values. However, the process can be reversed such that it is the harmonic backscatter sample values whose processing is altered in accordance with characteristics of the fundamental backscatter sample values (this is a less preferred embodiment). Further, in addition to the processing functionalities described above, the harmonic backscatter signal sample values may also be applied to subsequent ultrasound processing steps, such as envelope detection, gray scale mapping or phase-sensitive processing such as is performed for color flow or doppler flow detection. Thus, the non-linearly converted signals (i.e., harmonic backscatter signals) can be used to control multiple processing parameters, such as, but not limited to, gain, phase response, gray scale mapping, packet length, post-flow-detection filtering, host-gray scale filtering, etc.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for processing ultrasound signal samples to obtain an enhanced image of a structure, said method comprising the steps of:

a) obtaining a first plurality of signal samples from sensed backscatter signals falling within a range of frequencies about a fundamental frequency of a transmitted ultrasound signal;

b) obtaining a second plurality of signal samples from sensed backscatter signals falling within a range of frequencies about a harmonic of a transmitted ultrasound signal;

c) deriving control values from one of said first plurality of signal samples and said second plurality of signal samples;

d) controlling processing of another of one of said first plurality of signal samples and said second plurality of signal samples using said control values derived in step c).

2. The method as recited in claim 1, wherein the harmonic is a second harmonic of the transmitted ultrasound signal.

3. The method as recited in claim 1, wherein said control values are derived from said second plurality of signal samples and are used to control processing of spatially corresponding signal samples from said first plurality of signal samples.

4. The method as recited in claim 3, wherein step d) further controls said processing by altering a gain value applied to each of spatially corresponding signal samples derived from said first plurality of signal samples.

5. The method as recited in claim 3, wherein step d) further controls said processing by altering a center frequency and bandwidth of a filter function that is applied to each of said spatially corresponding signal samples from said first plurality of signal samples.

6. The method as recited in claim 5, wherein step d) alters said center frequency and bandwidth by selecting one of plural filter types so as to apply an altered filter function to each of said spatially corresponding signal samples from said first plurality of signal samples.

7. An ultrasound system for processing ultrasound signal samples to obtain an enhanced image of a structure, said system comprising:

receiver means for obtaining (i) a first plurality of signal samples from sensed backscatter signals falling within a range of frequencies about a fundamental frequency of a transmitted ultrasound signal and (ii) a second plurality of signal samples from sensed backscatter signals falling within a range of frequencies about a harmonic of a transmitted ultrasound signal; and processor means for deriving control values from one of said first plurality of signal samples and said second plurality of signal samples, and for controlling processing of another of one of said first plurality of signal samples and said second plurality of signal samples using said control values.

8. The system as recited in claim 7, wherein the harmonic is a second harmonic of the transmitted ultrasound signal.

9. The system as recited in claim 7, wherein said control values are derived from said second plurality of signal samples and are used to control processing of spatially corresponding signal samples from said first plurality of signal samples.

10. The system as recited in claim 9, wherein said processor means alters a gain value applied to each of spatially corresponding signal samples derived from said first plurality of signal samples.

11. The system as recited in claim 9, wherein said processor means alters a center frequency and bandwidth of a filter function that is applied to each of said spatially corresponding signal samples from said first plurality of signal samples.

12. The system as recited in claim 11, wherein said processor means alters said center frequency and bandwidth by selecting one of plural filter types so as to apply an altered filter function to each of said spatially corresponding signal samples from said first plurality of signal samples.

* * * * *